United States Patent
Alfoqaha et al.

(10) Patent No.: US 6,894,871 B2
(45) Date of Patent: May 17, 2005

(54) TECHNIQUE FOR REDUCING POLE TIP PROTRUSION IN A MAGNETIC WRITE HEAD AND GMR STRIPE TEMPERATURE IN AN ASSOCIATED READ HEAD STRUCTURE UTILIZING ONE OR MORE INTERNAL DIFFUSER REGIONS

(75) Inventors: Arshad Alfoqaha, San Jose, CA (US); Edmund Fanslau, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 299 days.

(21) Appl. No.: 10/214,044

(22) Filed: Aug. 7, 2002

(65) Prior Publication Data

US 2004/0027717 A1 Feb. 12, 2004

(51) Int. Cl.⁷ ............................................... G11B 5/147
(52) U.S. Cl. ...................................................... 360/126
(58) Field of Search ................................ 360/126, 125, 360/123, 317, 320, 120

(56) References Cited

U.S. PATENT DOCUMENTS

| | | | | |
|---|---|---|---|---|
| 5,025,341 A | * | 6/1991 | Bousquet et al. | 360/120 |
| 5,668,685 A | * | 9/1997 | Soeya et al. | 360/327.32 |
| 6,396,660 B1 | * | 5/2002 | Jensen et al. | 360/126 |
| 6,414,825 B1 | * | 7/2002 | Inoue et al. | 360/320 |

* cited by examiner

*Primary Examiner*—Allen Cao
(74) *Attorney, Agent, or Firm*—Joshua C. Harrison, Esq.; Hogan & Hartson LLP

(57) ABSTRACT

A technique for reducing pole tip protrusion ("PTP") in a magnetic write head and giant magnetoresistive ("GMR") stripe temperature in an associated read head structure utilizing one or more internal diffuser regions. In a representative embodiment disclosed, this may be effectuated through the appropriate placement of a relatively highly conductive material diffuser region (e.g. gold (Au) or copper (Cu)) above the poles, between the first pole and the coil and/or through the first pole, second and first shields and undercoat layer to the substrate in order to conduct heat away from the write head poles, insulating layers (e.g. photoresist) and shields.

29 Claims, 2 Drawing Sheets

TECHNIQUE FOR REDUCING POLE TIP PROTRUSION IN A MAGNETIC WRITE HEAD AND GMR STRIPE TEMPERATURE IN AN ASSOCIATED READ HEAD STRUCTURE UTILIZING ONE OR MORE INTERNAL DIFFUSER REGIONS

BACKGROUND OF THE INVENTION

The present invention relates, in general, to the field of magnetic recording heads. More particularly, the present invention relates to a technique for reducing pole tip protrusion ("PTP") in a magnetic write head and giant magnetoresistive ("GMR") stripe temperature in an associated read head structure utilizing one or more internal diffuser regions.

Recording heads are miniature components (with dimensions of on the order of about 1 mm$^2$) that read and write information to and from a hard-drive disk or another storage medium. When writing, the head acts as a small electromagnet wherein positive and negative pulses of current are translated into north and south magnetic poles on a rotating magnetic disk. When reading, the head senses magnetic fields from these poles and translates the alternating fields into positive and negative voltage pulses. These pulses become the bits of digital information stored on the disk. A recording head is generally bonded or otherwise affixed to a metal suspension, which is a small arm that holds the head in position above or beneath a rotating disk. The head and suspension is sometimes referred to as a head-gimbal assembly or HGA. Sets of HGA's stacked together for installation in a disk drive are denominated a head-stack assembly or HSA.

In general, recording heads function according to certain principles of magnetic recording which are based directly on four magnetic phenomena. These are: a) an electric current produces an accompanying magnetic field; b) Soft magnetic materials are easily magnetized when placed in a weak magnetic field and, when the field is turned off, the material rapidly demagnetizes; c) In some magnetically soft materials the electrical resistance changes when the material is magnetized and this resistance returns to its original value when the magnetizing field is turned off. This is the magnetoresistive ("MR") effect. The larger giant magnetoresistive ("GMR") effect, is exhibited by specific thin film materials systems; and d) Certain other materials are magnetized only with relatively greater difficulty (i.e., they require a strong magnetic field), but once magnetized, they retain their magnetization when the field is turned off. These are called hard magnetic materials or permanent magnets.

With respect to data storage, heads used for writing bits of information onto a spinning magnetic disk depend on phenomena a) and b) to produce and control strong magnetic fields. Reading heads depend on phenomena a), b), and c), and are sensitive to the residual magnetic fields of magnetized storage media d). On the other hand, magnetic storage media are permanently magnetized in a direction (North or South) determined by the writing field. Storage media exploit phenomenon d).

In the writing of data, a spiral coil is wrapped between two layers of soft magnetic material and at the lower end, there is a gap between these layers. At their upper end, these layers are joined together. The top and bottom layers of magnetic material are readily magnetized when an electric current flows in the spiral coil, so these layers become effectively the "North" and "South" magnetic poles of a small electromagnet. [In an actual head, the distance from the gap to the top of the coil may be on the order of about 30 microns (or 0.0012 inch).] The North-South poles at the gap end of the writing head further concentrate the field at this point, which is the area where the writing field leaks into space outside the head. When a magnetic storage medium (a spinning computer disk, for example) is placed in close proximity to the writing head, the hard magnetic material on the disk surface is permanently magnetized (or written) with a polarity that matches the writing field. If the polarity of the electric current is reversed, the magnetic polarity at the gap also reverses.

Computers store data on a rotating disk in the form of binary digits, or bits, transmitted to the disk drive in a corresponding time sequence of binary one and zero digits, or bits. These bits are converted into an electric current waveform that is delivered by wires to the writing head coil. In its simplest form, a "one" bit corresponds to a change in current polarity, while a "zero" bit corresponds to no change in polarity of the writing current. A moving disk is thus magnetized in the positive (North) direction for positive current and is magnetized in the negative (South) direction for negative current flow. In other words, the stored "ones" show up where reversals in magnetic direction occur on the disk and the "zeroes" reside between the "ones".

A timing clock is synchronized to the rotation of the disk and bit cells exist for each tick of the clock. Some of these bit cells will represent a "one" (a reversal in magnetic direction such as North going to South or South going to North) and others represent "zeroes" (constant North or constant South polarity). Once written, the bits at the disk surface are permanently magnetized in one direction or the other until new data patterns are written over the old. A fairly strong magnetic field exists directly over the location of "ones" and fades rapidly in strength as the recording head moves away. Moving significantly in any direction away from a "one" causes a dramatic loss of magnetic field strength. Thus, to reliably detect data bits, it is extremely important for reading heads to fly very close to the surface of a magnetized disk.

A basic writing head generally comprises a magnetic yoke, a writing gap in the yoke, and a coil for energizing the head field. Conventional reading heads have a GMR element with excitation/sensing leads and magnetic shield layers on both sides of the sensor. While writing and reading are clearly independent functions, it is very important to place write and read heads in close proximity to the recording medium, both to have the write gap and GMR element close to each other as well as to maintain tight geometrical alignment between both heads. In this manner, the top shield of the GMR sensor becomes the bottom magnetic pole of the writing head and the result is an integrated write-read structure, or so-called "merged-head" or "shared shield" design, where the GMR head and writing head share a common magnetic layer. (c.f. http://www.readrite.com)

Conventional inductive transducers for reading and writing information to magnetic storage media comprise layers of differing materials stacked together to enable them to effectuate their specified magnetic and mechanical functions. Relatively hard materials, such as ceramics, may be used for the head substrates while relatively softer magnetic poles and insulating layers are also required for their inherent magnetic and electrical properties. In use, the differential wear properties of these materials can cause the pole pieces to effectively recede from the air bearing surface ("ABS") resulting in what is known as pole tip recession ("PTR"). This undesired phenomena causes an increased spacing of the write head from the storage media with a concomitant and undesired decrease in available write density.

At the same time, these transducers can also exhibit pole tip protrusion ("PTP") problems due to the differing thermal expansion coefficients of the various layers as well as high GMR temperature problems due to excessive heat generated in the head structure from the electric current applied to the coils of the write head.

SUMMARY OF THE INVENTION

Disclosed herein is a technique for reducing pole tip protrusion ("PTP") in a magnetic write head and giant magnetoresistive ("GMR") stripe temperature in an associated read head structure utilizing one or more internal diffuser regions. In a representative embodiment, this may be effectuated through the appropriate placement of a relatively highly conductive material diffuser region (e.g. gold (Au) or copper (Cu) or other materials incorporating one or more of the same or similar elements) above the poles, between the first pole and the coil and/or through the first pole, second and first shields and undercoat to the substrate in order to conduct heat away from the write head poles, insulating layers (e.g. photoresist) and shields.

Through the use of the exemplary technique disclosed, PTP is significantly reduced as both gold and copper are very conductive materials. As a result, they are able to conduct away the heat generated by the current in the coils, photoresist, poles and shields. This results in a lower overall head temperature thereby minimizing thermal expansion and pole tip protrusion. Additionally, the GMR read head temperature is also sharply reduced due to the high thermal conductivity of the gold or copper regions. This provides a lower temperature distribution in the poles, photoresist, coils and shields, with the latter's lower temperature resulting in less heat conduction to the GMR sensor thereby reducing its operating temperature.

Particularly disclosed herein is a write head comprising a coil, a first pole in an underlying relationship to the coil, a second pole in an overlying relationship to the coil and at least one relatively high thermal conductivity diffuser region interposed between the coil and the first pole. Also disclosed herein is a write head comprising a coil, a first pole in an underlying relationship to the coil, a second pole in an overlying relationship to the coil and at least one relatively high thermal conductivity diffuser region in an overlying relationship to the coil and the second pole.

Still further disclosed herein is a write head comprising a coil, a first pole in an underlying relationship to the coil, a second pole in an overlying relationship to the coil, a midcoat layer interposed between the coil and the first pole and at least one relatively high thermal conductivity diffuser region interposed between the midcoat layer and extending through the first pole.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
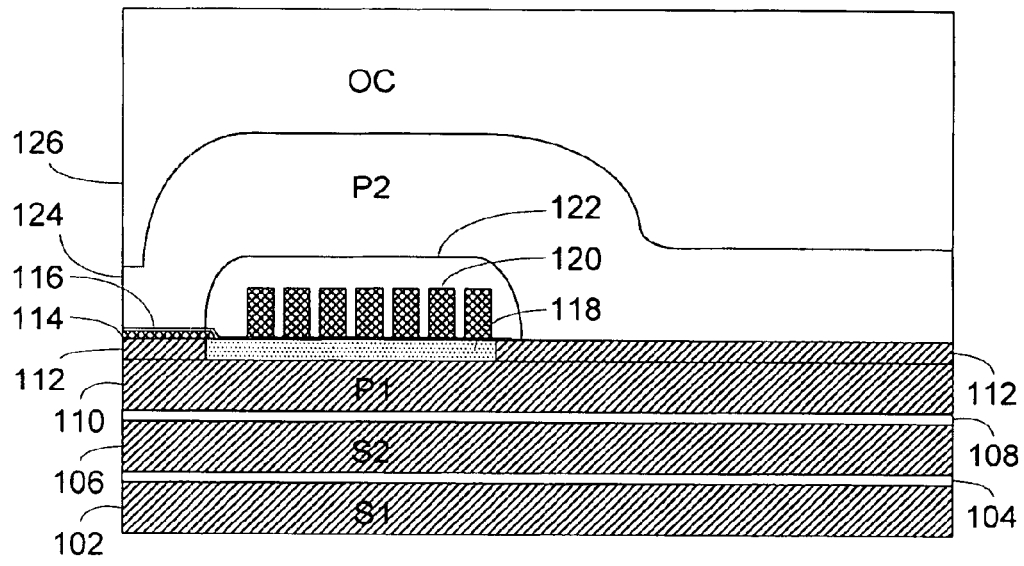
FIG. 1 is a simplified cross-sectional view of a portion of a conventional inductive write head which may form one part of a "merged-head" or "shared shield" transducer structure in conjunction with a GMR read head.

With reference now to FIG. 1, a simplified cross-sectional view of a portion of a conventional inductive write head 100 is shown. The write head 100 may form one part of a "merged-head" or "shared shield" transducer structure in conjunction with a magnetoresistive ("MR"), GMR or other read head (not shown).

The write head 100 comprises, in pertinent part, a first shield layer ("S1") 102 which may be formed, for example on an undercoat layer (not shown) of the overall transducer structure. A reader gap layer 104 is intermediate the first shield layer 102 and a second shield layer ("S2") 106. A piggyback gap layer 108 separates the second shield layer 106 from the first pole ("P1") 110. The first and second shield layers 102, 106 may be formed, for example, of permalloy and be between 1.5 and 2.0 microns in thickness.

A pedestal layer 112 is formed overlying the first pole 110 and is patterned to form the pedestal shown adjoining the air bearing surface of the write head 100. A high moment layer 114 (as disclosed and claimed in co-pending U.S. patent application Ser. No. 10/134,799 filed Apr. 29, 2002 for "Inductive Write Head Structure Incorporating a High Moment Film in Conjunction with At Least One Pole for Use with Magnetic Storage Media and a Process for Producing the Same", assigned to Read-Rite Corporation, assignee of the present invention, the disclosure of which is herein specifically incorporated by this reference) which may comprise a sputtered layer of between approximately 0.1 to 1.0 $\mu$m of CoFeN, FeXN, CoFeXn (where X=Rh, Ta, Al, Ti etc.) and the like, is formed over the pedestal and beneath the write gap layer 116.

As further illustrated, a midcoat layer 118 underlies a coil 120 which is surrounded by a second insulating ("I2") layer 122. A top pole ("P2") region overlies the write gap layer 116, the insulating layer 122 and the pedestal layer 112 as shown. It is covered by an overcoat ("OC") layer 126.

Figure 2:
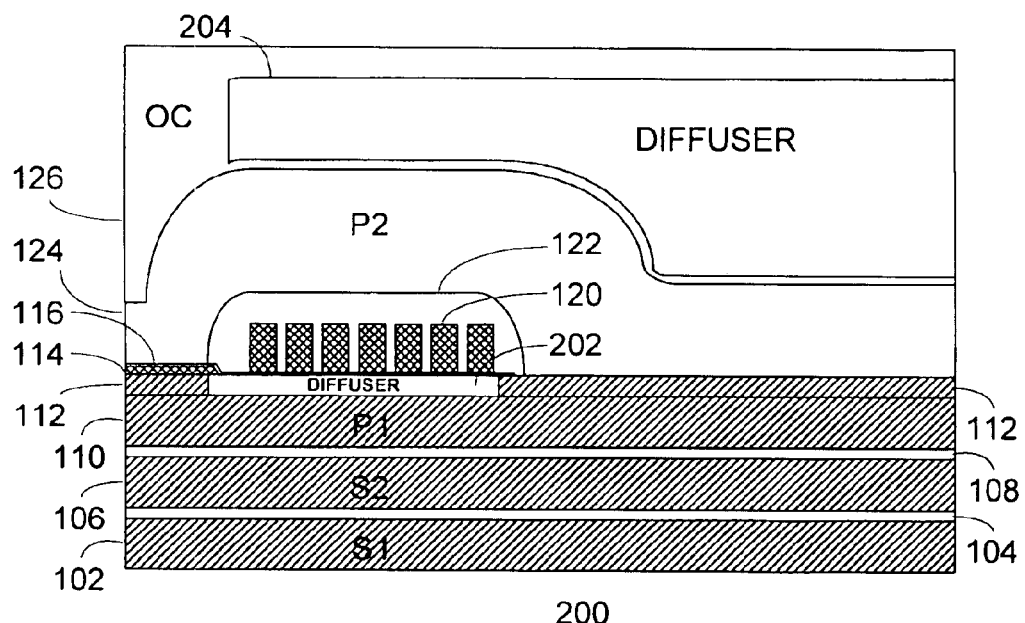
FIG. 2 is a simplified cross-sectional view of a portion of an inductive write head incorporating one or more relatively high thermal conductivity regions in accordance with the technique of the present invention for reducing PTP in a magnetic write head and GMR stripe temperature in an associated read head structure.

With reference additionally now to FIG. 2, a simplified cross-sectional view of a portion of an inductive write head 200 incorporating one or more relatively high thermal conductivity regions in accordance with the technique of the present invention is shown. The relatively high thermal conductivity regions advantageously serve to reduce PTP in a magnetic write head as well as the GMR stripe temperature in an associated read head structure.

As illustrated, the write head 200 may, in this regard, incorporate a diffuser 202 which is placed in substantially the same location as the midcoat layer 118 of the preceding figure in an underlying relationship with the coil 120.

Additionally, or alternatively, a separate diffuser 204 may be incorporated overlying the top pole 124 and formed, for example, within the overcoat layer 126. Whether used alone, or in combination, the diffusers 202, 204 serve as a relatively high thermal conductivity region in accordance with the technique of the present invention.

Figure 3:
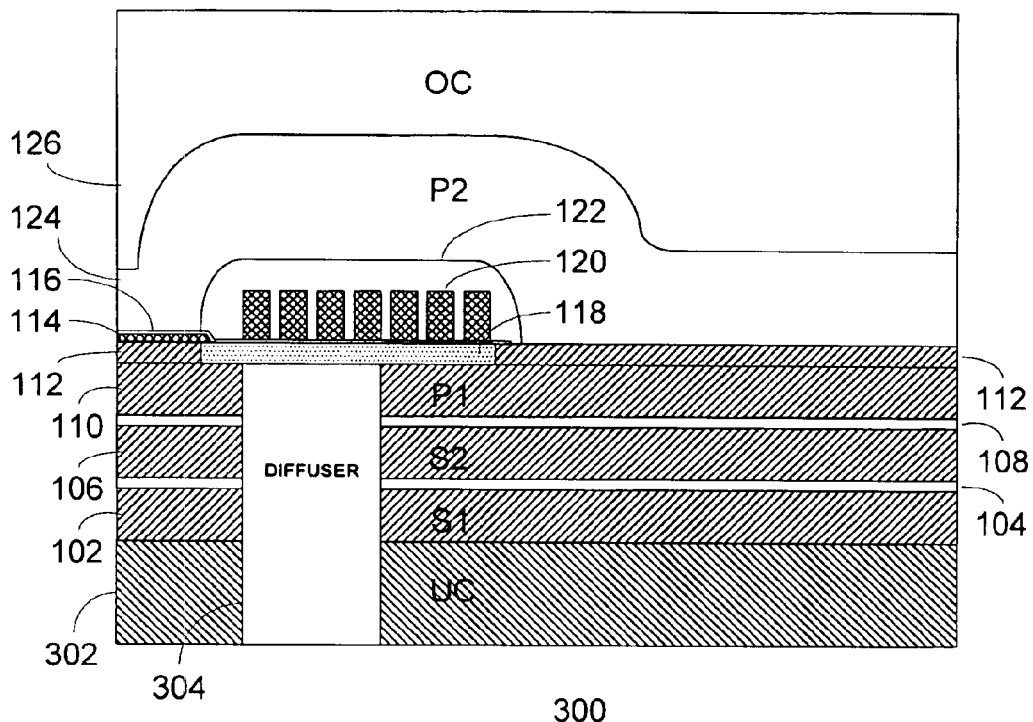
FIG. 3 is another simplified cross-sectional view of a portion of an inductive write head incorporating an alternative configuration and placement of a relatively high thermal conductivity region in accordance with the technique of the present invention.

With reference additionally now to FIG. 3, another simplified cross-sectional view of a portion of an additional representative embodiment of an inductive write head 300 is shown incorporating an alternative configuration and placement of a relatively high thermal conductivity region in accordance with the technique of the present invention. In this embodiment, a diffuser 304 is shown extending through the first pole 110, the second shield layer 106, first shield layer 102 through an undercoat ("UC") layer 302. The diffuser 304 may be used as an alternative to, or in conjunction with, the diffusers 202, 204 illustrated in the preceding figure.

The diffuser 304 has a depth equal to the distance between the midcoat layer 118 and the bottom of the undercoat layer 302. In the representative embodiment illustrated, this distance may be substantially 9.0 microns while the first shield layer 102 may have a thickness of substantially 2.0 microns and the second shield layer 106 may be substantially 1.5 microns thick. Both layers 102, 106 may be formed of permalloy. The undercoat layer 302 may be formed of alumina with a thickness of substantially 3.2 microns.

Figure 4:
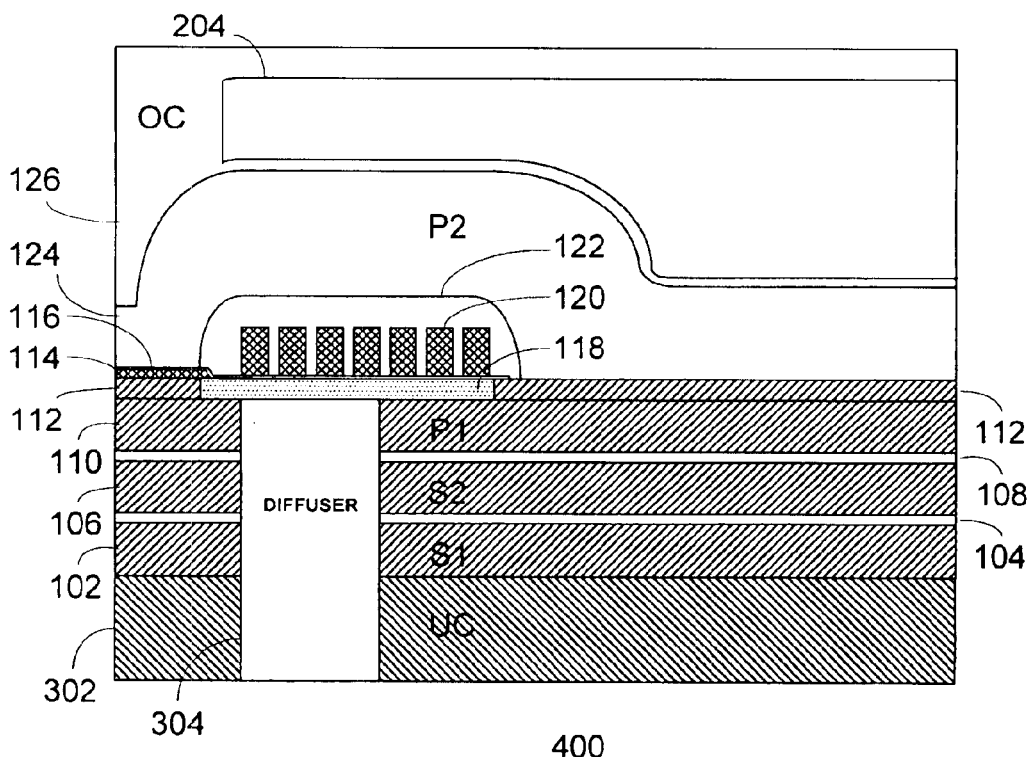
FIG. 4 is a further simplified cross-sectional view of a portion of an alternative embodiment of an inductive write head in accordance with the present invention illustrating the incorporation of a relatively high thermal conductivity region as a diffuser overlying the coil as shown in FIG. 2 together with an additional diffuser underlying the coil as shown in FIG. 3.

With reference additionally now to FIG. 4, a further simplified cross-sectional view of a portion of an alternative embodiment of an inductive write head 400 in accordance with the present invention is shown. The write head 400 illustrated incorporates a relatively high thermal conductivity region as a diffuser 204 overlying the coil 120 as previously shown in FIG. 2 together with an additional diffuser 304 underlying the coil 120 as was shown in FIG. 3.

While there have been described above the principles of the present invention in conjunction with specific write head structures and materials, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A write head comprising:
    a coil;
    a first pole in an underlying relationship to said coil;
    a second pole in an overlying relationship to said coil;
    at least one relatively high thermal conductivity diffuser region interposed between said coil and said first pole, wherein said at least one relatively high thermal conductivity diffuser region comprises an electrically conductive material; and
    a write gap layer interposed between said coil and said at least one relatively high thermal conductivity diffuser region, whereby said at least one relatively high thermal conductivity diffuser region is not in contact with said coil.

2. The write head of claim 1 wherein said at least one relatively high thermal conductivity diffuser region extends through said first pole to contact a substrate of said write head.

3. The write head of claim 1 wherein said at least one relatively high thermal conductivity diffuser region comprises Au or Cu.

4. The write head of claim 1 further comprising:
    another relatively high thermal conductivity diffuser region in an overlying relationship to said second pole.

5. The write head of claim 4 wherein said another relatively high thermal conductivity diffuser region comprises Au or Cu.

6. The write head of claim 1 further comprising:
    an insulating layer substantially surrounding said coil.

7. The write head of claim 1 further comprising:
    at least one shield layer in an underlying relationship with said first pole.

8. The write head of claim 1 further comprising:
    at least one overcoat layer in an overlying relationship with said second pole.

9. The write head of claim 1 further comprising:
    a pedestal layer overlying said first pole and substantially laterally surrounding said at least one relatively high thermal conductivity diffuser region.

10. The write head of claim 4 further comprising:
    a midcoat layer in substitution for said at least one relatively high thermal conductivity diffuser region.

11. The write head of claim 4 further comprising:
    a midcoat layer in substitution for said another relatively high thermal conductivity diffuser region.

12. A write head comprising:
    a coil;
    a first pole in an underlying relationship to said coil;
    a second pole in an overlying relationship to said coil; and
    at least one relatively high thermal conductivity diffuser region in an overlying relationship to said coil and said second pole, wherein said at least one relatively high thermal conductivity diffuser region comprises an electrically conductive material and wherein said at least one relatively high thermal conductivity diffuser region is spaced apart in said write head from both said coil and said second pole.

13. The write head of claim 12 wherein said at least one relatively high thermal conductivity diffuser region comprises Au or Cu.

14. The write head of claim 12 further comprising:
    another relatively high thermal conductivity diffuser region interposed between said coil and said first pole.

15. The write head of claim 14 wherein said another relatively high thermal conductivity diffuser region comprises Au or Cu.

16. The write head of claim 12 said another relatively high thermal conductivity diffuser region extends through said first pole to contact a substrate of said write head.

17. The write head of claim 12 further comprising:
an insulating layer substantially surrounding said coil, the insulating layer being interposed at least partially between said second pole and said at least one relatively high thermal conductivity diffuser region.

18. The write head of claim 12 further comprising:
at least one shield layer in an underlying relationship with said first pole.

19. The write head of claim 12 further comprising:
at least one overcoat layer in an overlying relationship with said second pole.

20. The write head of claim 12 further comprising:
a pedestal layer overlying said first pole and substantially laterally surrounding said at least one relatively high thermal conductivity diffuser region.

21. A write head comprising:
a coil;
a first pole in an underlying relationship to said coil;
a second pole in an overlying relationship to said coil;
a midcoat layer interposed between said coil and said first pole; and
at least one relatively high thermal conductivity diffuser region interposed between said midcoat layer and extending through said first pole, wherein said at least one relatively high thermal conductivity diffuser region comprises an electrically conductive material; and a write gap layer interposed between said coil and said at least one relatively high thermal conductivity diffuser region, whereby said at least one relatively high thermal conductivity diffuser region is not in contact with said coil.

22. The write head of claim 21 wherein said at least one relatively high thermal conductivity diffuser region extends through said first pole to contact a substrate of said write head.

23. The write head of claim 21 wherein said at least one relatively high thermal conductivity diffuser region comprises Au or Cu.

24. The write head of claim 21 further comprising:
another relatively high thermal conductivity diffuser region in an overlying relationship to said second pole.

25. The write head of claim 24 wherein said another relatively high thermal conductivity diffuser region comprises Au or Cu.

26. The write head of claim 21 further comprising:
an insulating layer substantially surrounding said coil.

27. The write head of claim 21 further comprising:
at least one shield layer in an underlying relationship with said first pole, said at least one relatively high thermal conductivity diffuser region extending through said at least one shield layer.

28. The write head of claim 21 further comprising:
at least one overcoat layer in an overlying relationship with said second pole.

29. The write head of claim 21 further comprising:
a pedestal layer overlying said first pole and substantially laterally surrounding said at least one relatively high thermal conductivity diffuser region.

* * * * *